United States Patent

Yim

[19]

[11] Patent Number: 5,815,336
[45] Date of Patent: Sep. 29, 1998

[54] METHOD FOR SENSING POSITION OF MAGNETIC TAPE DURING DISCONTINUOUS TRAVEL OF THE TAPE

[75] Inventor: Sang Soo Yim, Suwon, Rep. of Korea

[73] Assignee: Samsung Electronics Co., Ltd., Kyungki-Do, Rep. of Korea

[21] Appl. No.: 709,031

[22] Filed: Sep. 6, 1996

[30] Foreign Application Priority Data

Sep. 7, 1995 [KR] Rep. of Korea .................. 1995-29420

[51] Int. Cl.$^6$ ................................. G11B 15/52
[52] U.S. Cl. ...................... 360/72.3; 360/73.14
[58] Field of Search ............................. 360/72.3, 72.2, 360/74.1, 74.2, 73.14, 73.01

[56] References Cited

U.S. PATENT DOCUMENTS

| | | | |
|---|---|---|---|
| 4,363,048 | 12/1982 | Tanaka et al. ....................... | 360/72.3 |
| 4,644,436 | 2/1987 | Unno ................................... | 360/72.3 |
| 4,887,172 | 12/1989 | Steele .................................. | 360/72.3 |
| 4,963,999 | 10/1990 | Utsunomiya et al. .............. | 360/72.3 |
| 4,996,611 | 2/1991 | Ito ....................................... | 360/72.3 |
| 5,229,898 | 7/1993 | Fujisawa et al. .................... | 360/96.5 |

*Primary Examiner*—Nabil Hindi
*Attorney, Agent, or Firm*—Sughrue, Mion, Zinn, Macpeak & Seas, PLLC

[57] ABSTRACT

A method for sensing the position of a magnetic tape during a continuous travel of the magnetic tape in a video cassette recorder. The method is particularly applicable to a VCR which includes a capstan motor for feeding the magnetic tape in the video cassette recorder at a constant speed, a capstan motor frequency generator for generating a pulse signal having a value determined in accordance with a rotating operation of the capstan motor, a reel sensing unit for sensing a rotated state of a reel on which the magnetic tape is wound, and a microprocessor provided with a storage medium. The microprocessor serves to control the rotating operation of the capstan motor while detecting the number of pulses generated from the capstan motor frequency generator per revolution of the reel, thereby sensing the current position of the magnetic tape. The method involves the steps of detecting a predetermined number of pulses generated from the capstan motor frequency generator, checking the rotating direction of the capstan motor, and adding the detected number of pulses to a stored number of pulses or deducting the detected number of pulses to a stored number of pulses in accordance with the rotating direction of the capstan motor, and calculating the current position of the magnetic tape based on the number of pulses obtained by the computation.

5 Claims, 4 Drawing Sheets

METHOD FOR SENSING POSITION OF MAGNETIC TAPE DURING DISCONTINUOUS TRAVEL OF THE TAPE

BACKGROUND OF THE INVENTION

1. Field of the Invention

The present invention relates to a method for sensing the position of a magnetic tape during a discontinuous travel of the tape, and more particularly to a method for sensing the current position of a magnetic tape even when the magnetic tape travels discontinuously at intervals of a very short time in a video cassette recorder (VCR) which does not include start and end sensors.

2. Description of the Prior Art

Referring to FIG. 1, a conventional VCR is illustrated which can sense the start/end portions of a magnetic tape loaded in the VCR using sensors. As shown in FIG. 1, the VCR includes a light emitting element 1 mounted at a desired position in the deck of the VCR, and a pair of light receiving elements, namely, start and end sensors 2 and 3 respectively mounted on opposite side walls of the deck to receive an optical signal (light) emitted from the light emitting element 1.

Magnetic tapes for the well-known home video system (VHS) standard have an opaque magnetizing area for recording various information thereon and a pair of transparent lead areas respectively provided at the start and end tape portions, as shown in FIG. 2. Each transparent lead portion has a desired length of, for example, about 2 m.

Now, the procedure of sensing the start and end tape portions in the conventional VCR having the above-mentioned construction will be described.

While a magnetic tape loaded in the VCR travels, each light receiving element 2 or 3 detects an optical signal generated from the light emitting element 1 and generates a travel control signal or a stop control signal based on the result of its detection. The travel control signal is generated when the opaque magnetized area of the magnetic tape is disposed between the light emitting element and light receiving element whereas the stop control signal is generated when the transparent lead area is disposed between the light emitting element and light receiving element. That is, when the magnetizing area of the magnetic tape is disposed between the light emitting element and light receiving element, the optical signal emitted from the light emitting element 1 is blocked by an opaque magnetizing material coated over the magnetizing area of the magnetic tape, so that it can not be transmitted to neither the light receiving element 2 or 3. As a result, both the light receiving elements 2 and 3 are turned off, thereby generating a travel control signal which is, in turn, sent to a control means. Based on the travel control signal, the control means carries out a control operation for normal spooling of the magnetic tape.

On the other hand, when the lead area of the magnetic tape is disposed between the light emitting element and light receiving element, the optical signal emitted from the light emitting element 1 can pass through the lead area, so that it can be transmitted to the light receiving elements 2 and 3. As a result, the light receiving elements 2 and 3 are turned on, thereby generating a stop control signal which is, in turn, sent to the control means. Based on the stop control signal, the control means carries out a control operation for stopping the travel of the magnetic tape.

Such a conventional method is disclosed in U.S. Pat. No. 5,229,898 (issues on Jul. 20, 1993) in detail. However, the conventional method requires an expensive sensor device because it should include at least two light receiving elements in addition to one light emitting element.

Furthermore, the deck requires a difficult and complex assembling procedure due to the mounting position of the light is emitting element and light receiving elements because the light emitting element is mounted at the substantially central portion of the deck such that it protrudes whereas the light receiving elements are mounted on printed circuit boards respectively mounted on opposite side walls of the deck. As a result, the conventional method involves a degraded workability.

The light receiving element used in accordance with the conventional method should be contained in a separate case so as to prevent it from operating abnormally due to external light.

Since an additional space is needed to install the case in the deck, it is difficult to achieve compactness of the VCR.

The above-mentioned problems may be effectively solved by eliminating the light emitting element and light receiving elements. In this case, the current tape position should be accurately sensed under the condition that the light emitting element and light receiving elements are eliminated. In this connection, a method for sensing the current tape position has been proposed which can sense the current tape position without using the light emitting element and light receiving elements.

This method uses software for calculating the current tape position based on the rotation amounts of supply and take-up reels of a tape cassette loaded in the VCR and the rotation amount of a capstan motor adapted to feed the magnetic tape at a constant speed. The current position of the magnetic tape is calculated by counting the number of pulses generated from a capstan motor frequency generator (CFG) for every revolution of each reel by use of a microprocessor (not shown).

This will be described in more detail. The travelling speed of the magnetic tape is constant. Accordingly, the rotating speed of the capstan motor is constant. However, either reel rotates at a low speed when a large portion of the magnetic tape is wound around the reel whereas it rotates at a higher speed when a smaller portion of the magnetic tape is wound around the reel. This means that the number of CFG pulses generated in association with the reel, on which a large portion of the magnetic tape is wound, is higher than that generated in association with the other reel, on which a smaller portion of the magnetic tape is wound. When the end portion of the magnetic tape reaches one of the reels, the number of CFG pulses per one revolution of the reel, on which a larger portion of the magnetic tape is wound, reaches a maximum. Thus, the current position of the magnetic tape can be determined by sampling data about the number of CFG pulses per one revolution of the reel at various positions of the magnetic tape, thereby detecting the number of CFG pulses per one revolution of the reel based on the sampled data.

However, the current position of the magnetic tape can be determined only when the magnetic tape travels in a length corresponding to one revolution of the reel or greater. When the magnetic tape is in a discontinuous travel state in which the VCR changes its operation mode in accordance with a user's requirement for mode change before the travelling amount of the magnetic tape corresponds to one revolution of the reel, that is, when different operation modes, for example, the playback mode, travel mode and stop mode are repetitively executed within a period shorter than one revolution of the reel, it is impossible to detect the current position of the magnetic tape.

Since it is impossible to detect the current position of the magnetic tape, the rotating speed of the reel motor may not be reduced even when the end portion of the magnetic tape reaches the reel. In this case, the magnetic tape is severely tensed, thereby causing it to be stretched or cut.

SUMMARY OF THE INVENTION

Therefore, an object of the invention is to solve the above-mentioned problems and to provide a method for sensing the position of a magnetic tape during a discontinuous travel of the magnetic tape in a VCR which does not include light emitting and light receiving elements, capable of accurately determining the current position of the tape even when the operation mode of the VCR changes at intervals of a very short duration.

The present invention may be employed in a video cassette recorder which includes a capstan motor for feeding the magnetic tape in the video cassette recorder at a constant speed, a capstan motor frequency generator for generating a pulse signal having a value determined in accordance with a rotating operation of the capstan motor, a reel sensing unit for sensing a rotated state of a reel on which the magnetic tape is wound, and a microprocessor provided with a storage medium. The microprocessor serves to control the rotating operation of the capstan motor while detecting the number of pulses generated from the capstan motor frequency generator per revolution of the reel, thereby sensing the current position of the magnetic tape. The inventive method of the present invention comprises the steps of: (a) detecting the number of pulses generated from the capstan motor frequency generator in the unit of a predetermined number of pulses; (b) checking the rotating direction of the capstan motor, and adding the detected number of pulses to a stored number of pulses or deducting the detected number of pulses from the stored number of pulses in accordance with the rotating direction of the capstan motor; and (c) calculating the current position of the magnetic tape based on the number of pulses obtained by the computation executed at the step (b).

In accordance with the present invention, the step (b) comprises the steps of checking the rotating direction of the capstan motor, and adding the detected number of pulses to the stored number of pulses when the current rotating direction of the capstan motor is identical to an initial rotating direction of the capstan motor while deducting the detected number of pulses from the stored number of pulses when the current rotating direction of the capstan motor is different from the initial rotating direction of the capstan motor.

In accordance with the present invention, the step (c) comprises the steps of repetitively executing the steps (a) and (b) during one revolution of the reel, and detecting the stored number of pulses from the storage medium when the reel completes its one revolution, and detecting the current position of the magnetic tape based on the stored number of pulses which has been detected from the storage medium.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
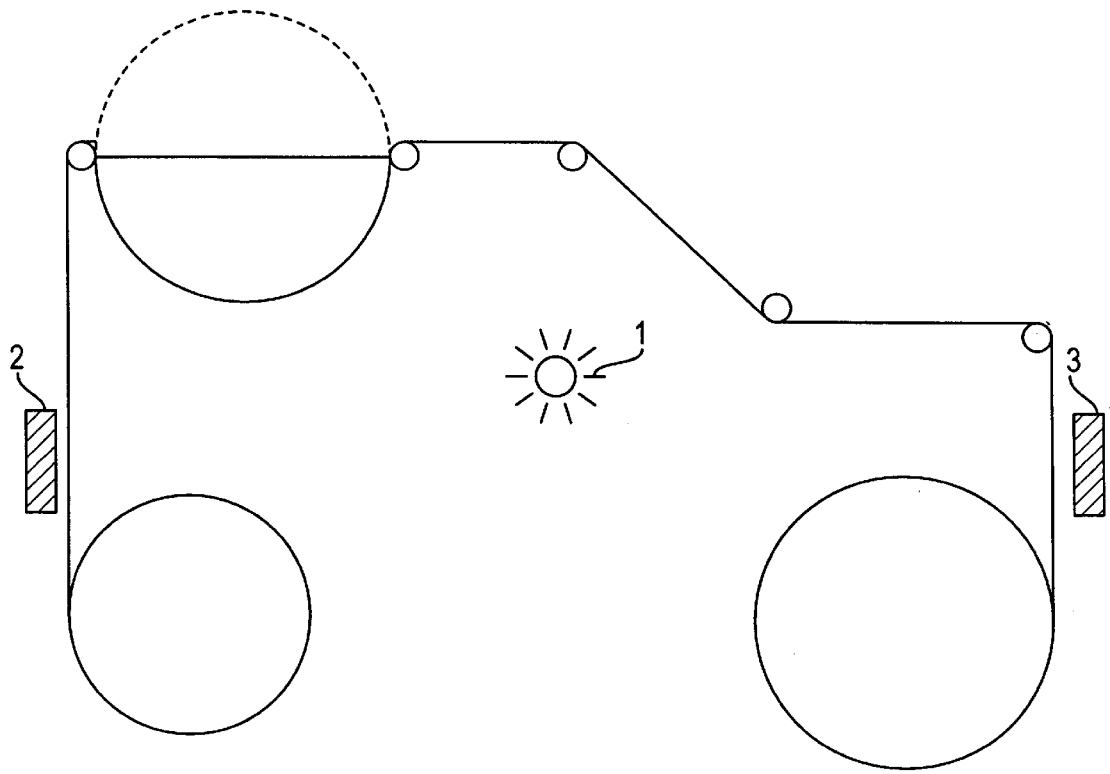
FIG. 1 is a schematic view illustrating a conventional VCR which can sense the start/end portions of a magnetic tape loaded in the VCR using optical sensors.
Figure 2:
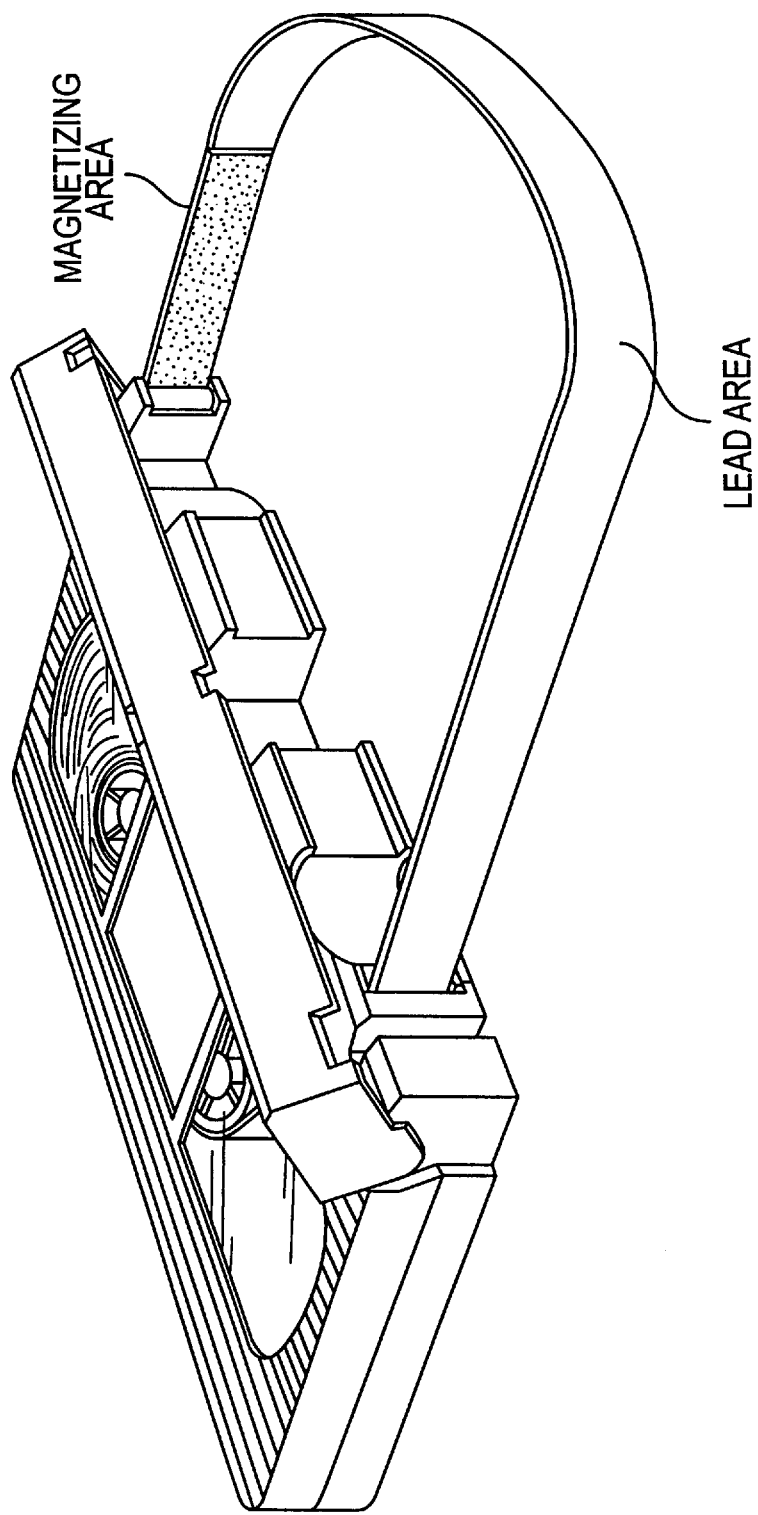
FIG. 2 is a schematic perspective view illustrating a magnetic tape for the well-known VHS standard.
Figure 3:
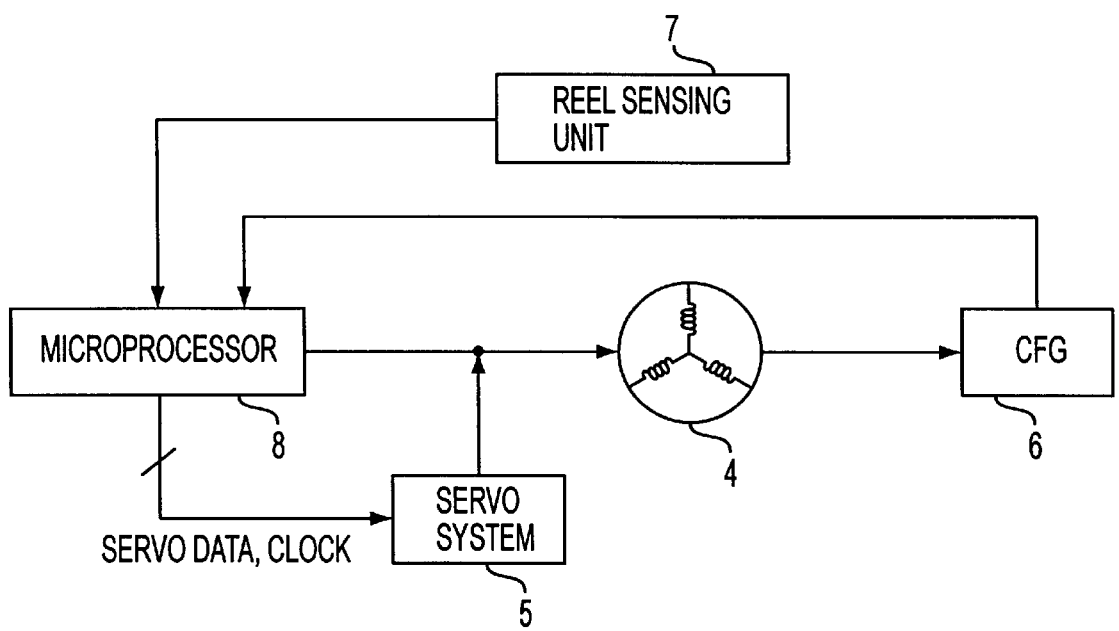
FIG. 3 is a block diagram schematically illustrating a VCR to which a method for sending the position of a magnetic tape during a discontinuous travel of the tape in accordance with the present invention is applied.

FIG. 3 shows a block diagram schematically illustrating a VCR to which a method for sensing the position of a magnetic tape during a discontinuous travel of the tape in accordance with the present invention is applied.

As shown in FIG. 3, the VCR includes a capstan motor 4 for feeding the magnetic tape of a tape cassette loaded in the VCR at a constant speed, a servo system 5 for controlling the rotating operation of the capstan motor 4, and a CFG 6 for generating a pulse signal having a value determined in accordance with the rotating operation of the capstan motor 4. The VCR also includes a reel sensing unit 7 for sensing the rotational state of a reel of the tape cassette, and a microprocessor 8 for outputting servo control data along with a clock signal at the servo system 5. The microprocessor 8 also serves to detect the number of CFG pulses per one revolution of the reel based on output signals from the reel sensing unit 8 and CFG 6. The microprocessor 8 is provided with data about positions of the magnetic tape corresponding to various numbers of CFG pulses per revolution of the reel. In order to store such data, the microprocessor 8 may be provided with a well-known storage medium.

Figure 4:
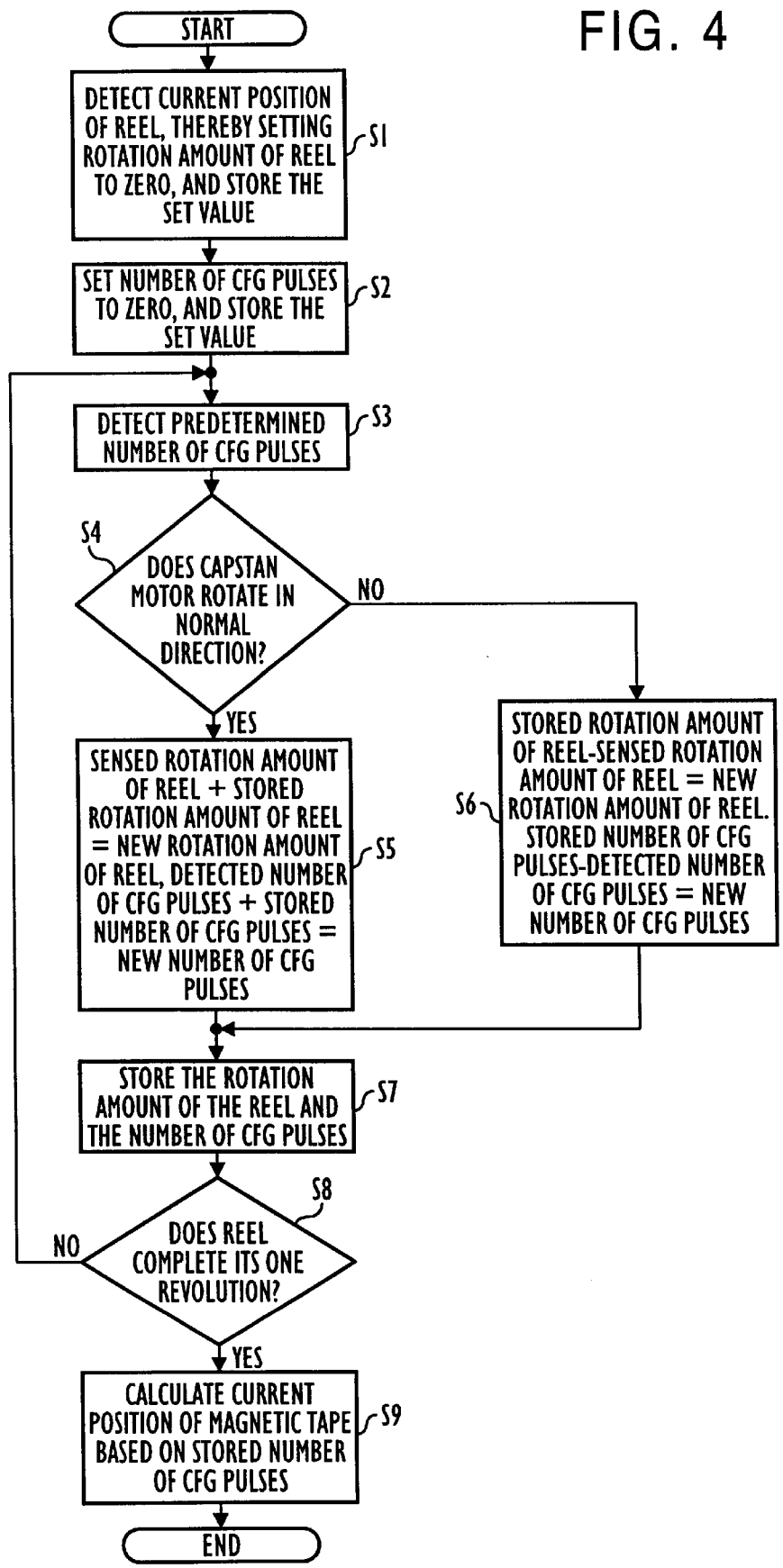
FIG. 4 is a flow chart illustrating the control operation of a microprocessor shown in FIG. 3 in accordance with the present invention.

Now, the method of the present invention which is carried out in the VCR having the above-mentioned arrangement will be described in conjunction with FIG. 4.

In accordance with the present invention, the number of CFG pulses generated during rotation of the reel is first detected. When a predetermined number of pulses have been detected, the detected number of CFG pulses is added to or deducted from a stored number of CFG pulses in accordance with the rotating direction of the capstan motor. As the addition and deduction computations are repetitively executed, it is possible to calculate the number of CFG pulses generated during one revolution of the reel even when the magnetic tape is is discontinuously played back.

That is, the microprocessor 8 detects the current position of the reel through the reel sensing unit 7. Based on the result of the detection, the microprocessor 8 initializes the rotation amount of the reel to be zero (0) (Step S1). At the same time, the number of CFG pulses is also initialized to be zero (0). The current position of the reel and the initialized number of CFG pulses are stored in the storage medium (not shown) included in the microprocessor 8 (Step S2).

Thereafter, the microprocessor 8 controls the CFG 6 to detect a predetermined number of CFG pulses (Step S3). It is then checked whether the capstan motor 4 rotates in a normal direction (Step S4). The reference rotating direction may be optionally determined. However, this direction should be identical to the initial rotating direction of the capstan motor. When it is determined at step S4 that the capstan motor 4 rotates in the normal direction, the microprocessor 8 adds the rotation amount of the reel detected by the reel sensing unit 7 to the rotation amount of the reel stored in the storage medium. The resultant value is then set as a new rotation amount of the reel. At the same time, the number of CFG pulses detected by the CFG 6 is added to the number of CFG pulses stored in the storage medium. The resultant value is then set as a new number of CFG pulses (Step S5).

On the other hand, when it is determined at step S4 that the capstan motor 4 rotates in the reverse direction, namely, the direction reverse to the initial rotating direction thereof, the microprocessor 8 deducts the rotation amount of the reel detected by the reel sensing unit 7 from the rotation amount of the reel stored in the storage medium. The resultant value is then set as a new rotation amount of the reel. At the same time, the number of CFG pulses detected by the CFG 6 is deducted from the number of CFG pulses stored in the storage medium. The resultant value is then set as a new number of CFG pulses (Step S6).

Subsequently, the microprocessor 8 stores the rotation amount of the reel and the number of CFG pulses, which are calculated at step S5 or S6, in the storage medium (Step S7). It is then checked whether the rotation amount of the reel stored in the storage medium corresponds to one revolution (Step S8). When the rotation amount of the reel does not correspond to one revolution, the procedure returns to step S3. In this case, the overall procedure is repetitively executed from step S3.

When it is determined at Step S8 that the rotation amount of the reel corresponds to one revolution, the microprocessor 8 calculates the current position of the magnetic tape based on the number of CFG pulses stored in the storage medium (Step S9). Thereafter, the above procedure is ended. As apparent from the above description, the method of the present invention provides an advantage in that the current position of the magnetic tape can be accurately sensed even in a discontinuous travel state of the magnetic tape in which the VCR changes its operation mode before the reel rotates one revolution because the current position of the magnetic tape is calculated by adding the varied number of CFG pulses to the stored number of CFG pulses or deducting the former number from the latter number.

Since the current position of the magnetic tape can be sensed even in the discontinuous travel state of the magnetic tape, it is possible to reduce the rotating speed of the reel motor as the end portion of the magnetic tape reaches the reel. Accordingly, it is possible to prevent the magnetic tape from being stretched or cut. As a result, the service life of the magnetic tape is extended.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for sensing the position of a magnetic tape during a discontinuous travel of the magnetic tape in a video cassette recorder, the video cassette recorder including a capstan motor for feeding the magnetic tape in the video cassette recorder at a constant speed, a capstan motor frequency generator for generating a pulse signal having a value determined in accordance with a rotating operation of the capstan motor, a reel sensing unit for sensing a rotated state of a reel on which the magnetic tape is wound, and a microprocessor provided with a storage medium, the microprocessor serving to control the rotating operation of the capstan motor while detecting the number of pulses generated from the capstan motor frequency generator per revolution of the reel, thereby sensing the current position of the magnetic tape, the method comprising the steps of:

(a) counting a predetermined number of pulses generated from the capstan motor frequency generator;

(b) checking the rotating direction of the capstan motor and, depending on the rotating direction of the capstan motor, performing one of:
   adding the detected number of pulses to a stored number of pulses and
   deducting the detected number of pulses from the stored number of pulses; and (c) calculating the current position of the magnetic tape based on the number of pulses obtained by the computation executed at step (b).

2. The method in accordance with claim 1, wherein step (b) comprises the steps of:
   checking the rotating direction of the capstan motor; and
   adding the detected number of pulses to the stored number of pulses when the current rotating direction of the capstan motor is identical to an initial rotating direction of the capstan motor while deducting the detected number of pulses from the stored number of pulses when the current rotating direction of the capstan motor is different from the initial rotating direction of the capstan motor.

3. The method in accordance with claim 1, wherein step (c) comprises the steps of:
   repetitively executing steps (a) and (b) during one revolution of the reel, and detecting the stored number of pulses from the storage medium when the reel completes one revolution; and
   detecting the current position of the magnetic tape based on the stored number of pulses which have been detected from the storage medium.

4. A microprocessor for a magnetic tape player, said magnetic tape player including a capstan motor for feeding the magnetic tape in the video cassette recorder at a constant speed, capstan motor frequency generator for generating a pulse signal having a value determined in accordance with a rotating operation of the capstan motor, a reel sensing unit for sensing a rotated state of a reel on which the magnetic tape is wound, said microprocessor provided with a storage medium and serving to control the rotating operation of the capstan motor while detecting the number of pulses generated from the capstan motor frequency generator per revolution of the reel, thereby sensing the current position of the magnetic tape, said microprocessor preprogrammed to perform the steps comprising:

(a) counting a predetermined number of pulses generated from the capstan motor frequency generator;

(b) checking the rotating direction of the capstan motor and, depending on the rotating direction of the capstan motor, performing one of:
   adding the detected number of pulses to a stored number of pulses and
   deducting the detected number of pulses from the stored number of pulses; and (c) calculating the current position of the magnetic tape based on the number of pulses obtained by the computation executed at step (b).

5. A computer readable medium having a program saved thereupon for controlling a microprocessor of a magnetic tape player, said magnetic tape player including a capstan motor for feeding the magnetic tape in the video cassette recorder at a constant speed, a capstan motor frequency generator for generating a pulse signal having a value determined in accordance with a rotating operation of the capstan motor, a reel sensing unit for sensing a rotated state of a reel on which the magnetic tape is wound, and a microprocessor provided with a storage medium, the microprocessor serving to control the rotating operation of the capstan motor while detecting the number of pulses generated from the capstan motor frequency generator per revolution of the reel, thereby sensing the current position of the magnetic tape, said program comprising the steps of:

(a) counting a predetermined number of pulses generated from the capstan motor frequency generator;

(b) checking the rotating direction of the capstan motor and, depending on the rotating direction of the capstan motor, performing one of:
   adding the detected number of pulses to a stored number of pulses and
   deducting the detected number of pulses from the stored number of pulses; and (c) calculating the current position of the magnetic tape based on the number of pulses obtained by the computation executed at step (b).

* * * * *